Patented Feb. 3, 1942

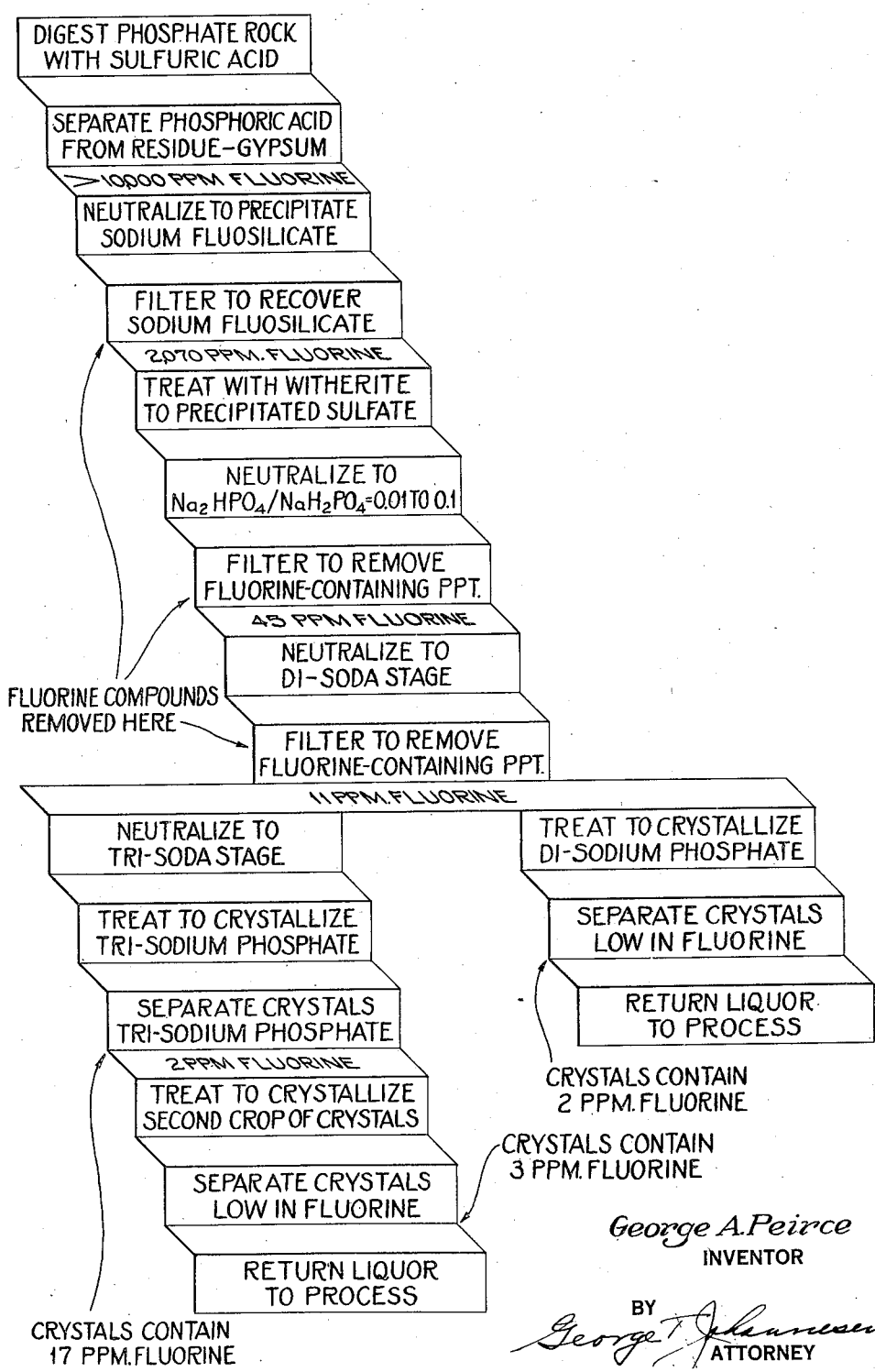

2,271,712

UNITED STATES PATENT OFFICE 2,271,712

MANUFACTURE OF SODIUM PHOSPHATE

George A. Peirce, Westfield, N. J., assignor to E. I. du Pont de Nemours & Company, Wilmington, Del., a corporation of Delaware Application December 19, 1939, Serial No. 309,964

7 Claims. (Cl. 23—107)

This invention relates to the manufacture of sodium phosphates from phosphoric acid obtained by the decomposition of phosphate rock with sulfuric acid, and is particularly directed to processes in which multiple stage neutralization and filtration are so carried out that products relatively free of fluorine impurities are obtained.

Crude phosphoric acid made by the extraction of phosphate rock with sulfuric acid contains objectionable quantities of fluorine impurities principally as hydrofluosilicic acid or hydrofluoric acid, or both. It also contains other impurities, such as magnesia, alumina, and lime, which are capable of uniting with fluorine to form insoluble impurities under different conditions of acidity. Thus, fluorine may be precipitated as sodium fluosilicate, as sodium fluoaluminate or as alkaline earth metal fluorides.

I have found that the solubility of these various compounds differ with the degree of acidity of the phosphate solutions and that by taking advantage of these differences in solubility fluorine can be eliminated from phosphate liquors to a degree not heretofore possible except by special treatment of the phosphoric acid or by recrystallization of the recovered disodium or trisodium phosphate. Thus, from phosphoric acid obtained direct from the extraction of phosphate rock by sulfuric acid and without any special treatment for the removal of impurities I am able to obtain disodium phosphate crystals having as little as four parts per million fluorine and less by separating out the major portion of the fluorine impurities as sodium fluosilicate, neutralizing to monosodium phosphate, separating out impurities while the liquor contains at least about one per cent disodium phosphate, neutralizing to disodium phosphate and again separating out impurities.

The particular nature of my invention may be more fully understood by reference to the accompanying drawing which represents the various steps of a process according to the following example, in which the parts are by weight unless otherwise indicated:

Example

Crude phosphoric acid direct from the extraction of phosphate rock with sulfuric acid is neutralized with recycled disodium phosphate liquor to a stage of neutralization at which the bulk of the fluorine is precipitated as sodium fluosilicate and at which the liquor is still sufficiently acid to prevent precipitation of acid-soluble phosphates. By acid soluble phosphates I means phosphates such as iron phosphates which are soluble in acid medium but which precipitate on neutralization of the acid. The filtrate thus obtained is referred to herein as stripped phosphoric acid. A typical stripped acid has the following analysis:

| | Per cent |
|---|---|
| CaO | 0.36 |
| Total $SO_3$ | 0.60 |
| Excess $SO_3$ | 0.09 |
| $Na_2O$ | 1.43 |
| MgO | 0.015 |
| Mn | 0.014 |
| Fe | 0.19 |
| $Al_2O_3$ | 0.47 |
| F | 0.207 |
| $P_2O_5$ | 20.41 |

To 500 parts of stripped phosphoric acid, of the above analysis and having a gravity of 25.1° Baumé at 79° F., was added 5.8 parts of witherite (barium carbonate), without separation of the precipitated barium sulfate and without heating. Soda ash (sodium carbonate) was then added in an amount sufficient to react with the phosphoric acid to form monosodium phosphate and the endpoint adjustment was made so that about 2.5 per cent of the $P_2O_5$ was present as disodium phosphate, after which the batch was filtered. The monosoda liquor (filtrate) at this point was found to contain 45 parts per million fluorine. After heating the monosoda liquor to 190° F. soda ash was added until the disoda stage was reached. At this point the batch was again filtered and the disoda liquor was found to have a fluorine content of about 11 parts per million. When the mono stage filtration was omitted the disoda liquor contained more fluoride than the monosoda liquor, indicating that some of the fluorine compounds precipitated at the mono stage had redissolved on further neutralization.

On cooling 130 parts of the disoda liquor to 85° F. disodium phosphate crystals separated out. After filtering and washing with 4 parts of cold water 84 parts of crystals were obtained. These crystals analyzed 2 parts per million fluorine.

140 parts of the disoda liquor was heated to 190° F. and 31 parts of 50 per cent caustic of soda solution added to convert it to trisodium phosphate. The trisoda liquor was then boiled for a few minutes and then diluted with hot water to 33° Baumé at 175° F. On cooling trisodium phosphate crystals separated out. 200 parts of trisoda liquor gave 80 parts of crystals and 115 parts of mother liquor. These crystals analyzed 17 parts per million fluorine and the mother liquor 2 parts per million fluorine.

The trisoda mother liquor from the above crystallization was concentrated to 33° Baumé at 175° F. and 1.6 parts of 50 per cent caustic of soda solution was added to reconvert it to trisodium phosphate. 78 parts of this trisoda liquor was then cooled and 39 parts of crystals was obtained. These crystals analyzed 3 parts per million fluorine.

The relatively large amount of fluorine in the first crop of trisodium phosphate crystals indicates that the fluorine compounds present, probably sodium fluoride, combine with the trisodium phosphate as a double salt. Hence, if high purity trisodium phosphate is desired, the first crop of crystals should be discarded and the desired crystals obtained from the second crop. Trisodium phosphate crystals of low fluorine content can also be made from the disodium phosphate crystals containing 2 parts per million fluorine.

Various modifications may be made in the above procedure without departing from the spirit and scope of my invention. Various types of sodium bases, such as sodium carbonate, trisodium phosphate, disodium phosphate, sodium hydroxide, etc., may be utilized in the neutralization steps. Various other materials may be added to effect precipitation of other impurities, for example, sodium sulfide to effect precipitation of lead and arsenic. The disoda liquor obtained after the final filtration may be used for different purposes, as, for example, for the production of crystals of disodium phosphate dodecahydrate or duohydrate, anhydrous disodium phosphate or tetra sodium pyrophosphate, or the liquor may be further neutralized to produce trisodium phosphate.

The concentration of the crude phosphoric acid may be varied. Thus, the $P_2O_5$ content of the stripped acid may vary from about 10 to 30 per cent. Preferably, however, the stripped acid should contain about 20–21 per cent $P_2O_5$.

The extent of neutralization prior to the first filtration is not especially critical and may be varied over considerable range, in accordance with the principle set forth in Patent 1,456,594, granted May 29, 1922 to Henry Howard. The purpose of the first filtration is to remove the bulk of the fluorine as sodium silicofluoride uncontaminated with other impurities, such as insoluble phosphates, which are thrown down if the neutralization is continued too far, and those skilled in the art will be able to determine the neutralization required best to effect these ends. It will ordinarily be suitable, however, if the neutralization is carried to the point at which the filtrate contains about 10 to 20 parts soluble $P_2O_5$ for each part soluble $Na_2O$, and most satisfactory results are obtained when the ratio of soluble $P_2O_5$ to soluble $Na_2O$ is about 14 or 15. Preferably, the amount of fluorine left in the stripped acid should not exceed about 0.25 per cent.

The mono stage neutralization is critical and unless the neutralization is carried to slightly beyond the mono stage and terminated before any large amount of disodium phosphate is formed the advantages of my invention are not obtained. Thus, to obtain the advantages of my invention the neutralization at the mono stage should be carried to the point at which the ratio of disodium phosphate to monosodium phosphate is about 0.01 to 0.1. In other words, the second filtration should be effected when the liquor contains at least about 1 per cent of its soluble $P_2O_5$ as disodium phosphate. The amount of $P_2O_5$ combined as disodium phosphate should not exceed about 5 per cent if best results are to be obtained, but can be carried up to about 10 per cent without greatly increasing the solubility of the fluorine compounds present as impurities.

If disodium phosphate is the desired product the second filtration is effected preferably at substantially the disoda stage so that after filtering the disodium phosphate may be crystallized out without interposing endpoint adjustment. When trisodium phosphate is the desired product, however, considerable latitude may be observed in the second filtration. Ordinarily, it may be found most suitable to effect the second filtration at the end of the sodium carbonate neutralization and before the sodium hydroxide neutralization. This, according to the usual practices in the art, may vary between about 1 and 3 per cent of the $P_2O_5$ as monosodium phosphate. My invention, however, is not limited in this respect, since the precise point at which the second filtration is effected is not critical insofar as reduction of fluorine content is concerned.

The mono stage neutralization may be effected either in the cold or with application of heat. Thus, the soda ash may be added directly to the stripped acid at room temperature. The temperature will rise, however, due to the heat of the reaction and best results are obtained if the mono stage neutralization and filtration are effected at a temperature of about 80 to 120° F. At the lower temperatures the reaction is slower and the mono soda liquor filters less easily, but the precipitation of fluorine impurities is more complete and arsenic, previously precipitated as a sulfide in the acid, can be filtered off with residue without redissolving. Whether or not the mono stage neutralization is effected hot or cold it is desirable to effect the neutralization from the mono to the disoda stage at a temperature between about 190° F. and the boiling point.

It will be apparent from the foregoing that effecting multiple filtration at certain critical stages in the neutralization of the crude acid substantially all the fluorine may be eliminated from the disodium phosphate liquor so that products may be recovered therefrom which contain only insignificant quantities of fluorine. In addition, a further advantage is obtained in that there is less reversion of sulfates. In order to reduce the sulfate content of the phosphate products barium carbonate, usually in the form of ground witherite ore, is added to the stripped phosphoric acid prior to the neutralization with soda ash. This precipitates barium sulfate, which is subsequently filtered off. If the barium treated phosphoric acid is heated and neutralized directly to disodium phosphate, a portion of the barium sulfate reverts to barium diphosphate ($BaHPO_4$), thus reducing the efficiency of the barium treatment and increasing the sulfate content of the disoda liquor and eventually the sulfate in the products. I have found that when the barium treated phosphoric acid is neutralized cold to mono-sodium phosphate and the precipitated barium sulfate is filtered off at this point there is considerably less reversion thereby improving the efficiency of the barium treatment and reducing the sulfate content of the phosphate liquors and products. This results in a saving in witherite and a marked improvement in the quality of the finished products. Further-more, if the carbonates and sulfates are later salted out from the trisodium phosphate mother liquors, the evaporator salt produced contains a much higher proportion of carbonate to sulfate and can be profitably returned to the phosphoric acid just before barium treatment, thereby recovering the sodium carbonate and the $P_2O_5$ in the trisodium phosphate in the salt.

I claim:

1. In the manufacture of sodium phosphate from phosphoric acid obtained by the digestion of phosphate rock with sulfuric acid the method of obtaining products substantially free of fluorine which comprises separating out the major portion of the fluorine impurities as sodium fluosilicate, neutralizing to mono-sodium phosphate and separating out fluorine-containing impurities while the monosoda liquor contains at least about 1 per cent and not substantially greater than 10 per cent of its $P_2O_5$ content as disodium phosphate, neutralizing the liquor further to disodium phosphate and again separating out fluorine-containing impurities.

2. In the manufacture of sodium phosphate from phosphoric acid obtained by the digestion of phosphate rock with sulfuric acid the method of obtaining products substantially free of fluorine which comprises separating out the major portion of the fluorine impurities as sodium fluosilicate, neutralizing to monosodium phosphate and separating out fluorine-containing impurities while the liquor contains about 1 to 5 per cent of its $P_2O_5$ content as disodium phosphate, neutralizing the liquor further to disodium phosphate and again separating out fluorine-containing impurities.

3. In the manufacture of sodium phosphate from phosphoric acid obtained by the digestion of phosphate rock with sulfuric acid the method of obtaining products substantially free of fluorine which comprises neutralizing the phosphoric acid with recycled disodium phosphate liquor until the liquor contains about 10 to 20 parts soluble $P_2O_5$ for each part soluble $Na_2O$, separating out the precipitated sodium fluosilicate, neutralizing the liquor further with sodium carbonate until the ratio of disodium phosphate to monosodium phosphate is about 0.01 to about 0.1 and separating out precipitated fluorine-containing impurities, neutralizing the liquor further with sodium carbonate to disodium phosphate and again separating out the precipitated fluorine-containing impurities.

4. In the manufacture of sodium phosphate from phosphoric acid obtained by the digestion of phosphate rock with sulfuric acid the method of obtaining products substantially free of fluorine which comprises neutralizing the phosphoric acid with recycled disodium phosphate liquor until the liquor contains about 10 to 20 parts soluble $P_2O_5$ for each part soluble $Na_2O$, separating out the precipitated sodium fluosilicate, neutralizing the liquor further with sodium carbonate until the ratio of disodium phosphate to monosodium phosphate is about 0.01 to about 0.1 and separating out precipitated fluorine-containing impurities, neutralizing the liquor further with sodium carbonate to disodium phosphate and again separating out the precipitated fluorine-containing impurities, neutralizing the liquor with sodium hydroxide to trisodium phosphate and crystallizing out two crops of trisodium phosphate crystals, whereby substantially all the fluorine is removed in the first crop of crystals and the second crop is substantially free of fluorine.

5. In a method of making sodium phosphate from phosphoric acid obtained by the digestion of phosphate rock with sulfuric acid in which the phosphoric acid is neutralized at least to the disodium phosphate stage by means of sodium bases, that improvement which comprises effecting three separate separations of precipitated impurities during the neutralization, the first separation being effected at a neutralization at which the bulk of the fluosilicic acid is thrown down as essentially pure sodium fluosilicate, the second separation being effected at that neutralization stage at which the liquor contains at least about one per cent and not substantially greater than 10 per cent of its $P_2O_5$ content as disodium phosphate, and the third separation being effected substantially at the disodium phosphate stage, whereby the bulk of the fluorine is removed in the first separation and further and significant quantities of fluorine-containing impurities are removed in the other two separations.

6. In the manufacture of sodium phosphate from phosphoric acid obtained by the digestion of phosphate rock with sulfuric acid the method of obtaining products substantially free of fluorine which comprises neutralizing the phosphoric acid with recycled disodium phosphate liquor until the liquor contains about 10 to 20 parts soluble $P_2O_5$ for each part soluble $Na_2O$, separating out the precipitated sodium fluosilicate, treating the liquor with a barium compound to precipitate sulfate before any further separation of precipitated impurities is effected, neutralizing the liquor further with sodium carbonate until the ratio of disodium phosphate to monosodium phosphate is about 0.01 to about 0.1 and separating out precipitated fluorine-containing impurities, neutralizing the liquor further with sodium carbonate to disodium phosphate and again separating out the precipitated fluorine-containing impurities.

7. In the manufacture of sodium phosphate from phosphoric acid obtained by the digestion of phosphate rock with sulfuric acid the method of obtaining products substantially free of fluorine which comprises separating out the major portion of the fluorine impurities as sodium fluosilicate, treating the liquor with a barium compound to precipitate sulfate before any further separation of precipitated impurities is effected, neutralizing to monosodium phosphate and separating out fluorine-containing impurities while the monosoda liquor contains at least about 1 per cent and not substantially greater than 10 per cent of its $P_2O_5$ content as disodium phosphate, neutralizing the liquor further to disodium phosphate and again separating out fluorine-containing impurities.

GEORGE A. PEIRCE.